United States Patent [19]

Wright

[11] Patent Number: 5,174,382

[45] Date of Patent: Dec. 29, 1992

[54] HORSES HOOF COVER WITH PUMP AND METHOD OF USE

[76] Inventor: Christopher A. Wright, 171 Bloomingbank Rd., Riverside, Ill. 60546

[21] Appl. No.: 788,842

[22] Filed: Nov. 7, 1991

[51] Int. Cl.⁵ .............................................. A01L 7/02
[52] U.S. Cl. ........................................ 168/28; 168/18
[58] Field of Search ................ 128/80 R, 80 D, 80 E, 128/80 J, 87 R, 594, 882, 892, 893, 894, DIG. 20, 25 B, 64, 67, 38–40; 168/2, 4, 6, 11, 18, 26–28; 54/82

[56] References Cited

U.S. PATENT DOCUMENTS

| | | | |
|---|---|---|---|
| 895,994 | 8/1908 | Fawkes | 168/28 |
| 3,121,430 | 2/1964 | O'Reilly | 128/594 |
| 3,703,209 | 11/1972 | Glass | 168/4 |
| 4,185,695 | 1/1980 | Hancock | 168/26 |
| 4,573,538 | 3/1986 | Figueras | 168/28 |
| 4,614,180 | 9/1986 | Gardner et al. | 128/25 B |
| 4,775,011 | 10/1988 | McCuan | 168/12 |
| 4,794,991 | 1/1989 | Honderich | 168/26 |

FOREIGN PATENT DOCUMENTS

| | | | |
|---|---|---|---|
| 3804296 | 3/1989 | Fed. Rep. of Germany | 168/4 |
| 187294 | 10/1922 | United Kingdom | 168/28 |

Primary Examiner—Richard J. Apley
Assistant Examiner—John P. Leubecker
Attorney, Agent, or Firm—Kinzer, Plyer, Dorn, McEachran & Jambor

[57] ABSTRACT

A device and method for use in preventing laminitis in the foot of a horse includes a boot which is formed and adapted to fit over the horse's hoof. A bladder is positioned inside of the boot and beneath the frog of the horse's hoof. A pump is connected to the bladder and pulsates the bladder to provide pulsating pressure to the frog of the horse's foot to simulate the pressure applied to the frog when the horse is walking. Pulsation of the frog has the effect of removing fluid which may tend to cause a softening of the area where the coffin bone of the horse's foot attaches to the hoof.

2 Claims, 1 Drawing Sheet

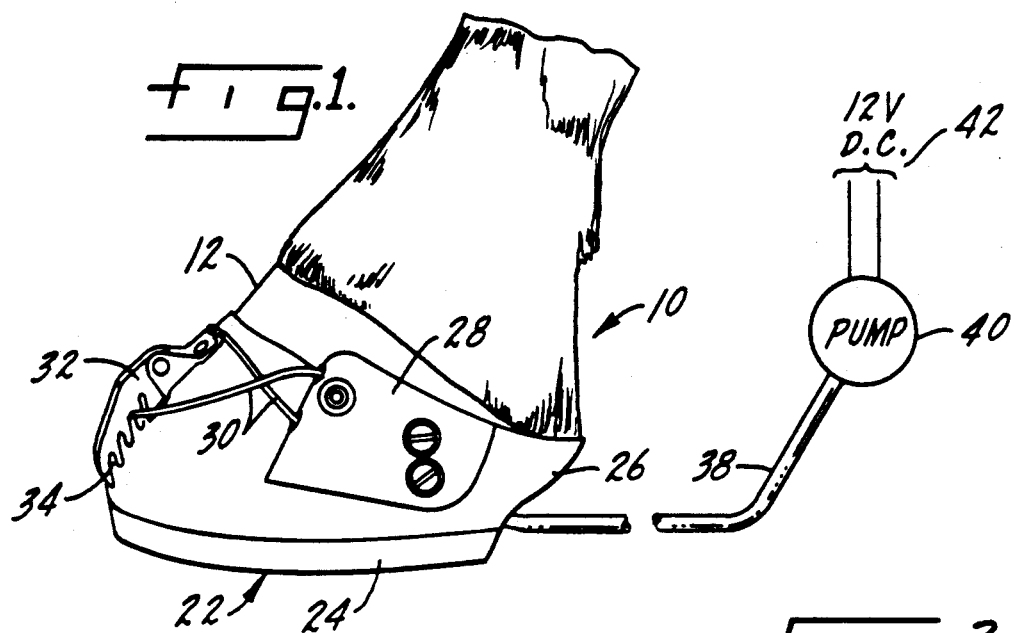
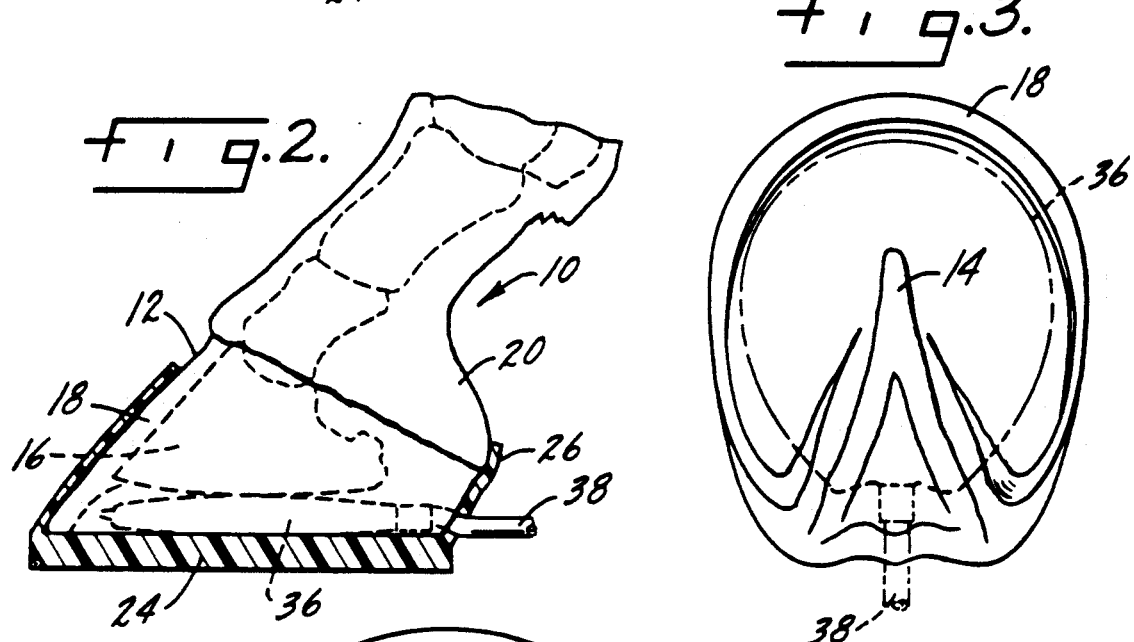
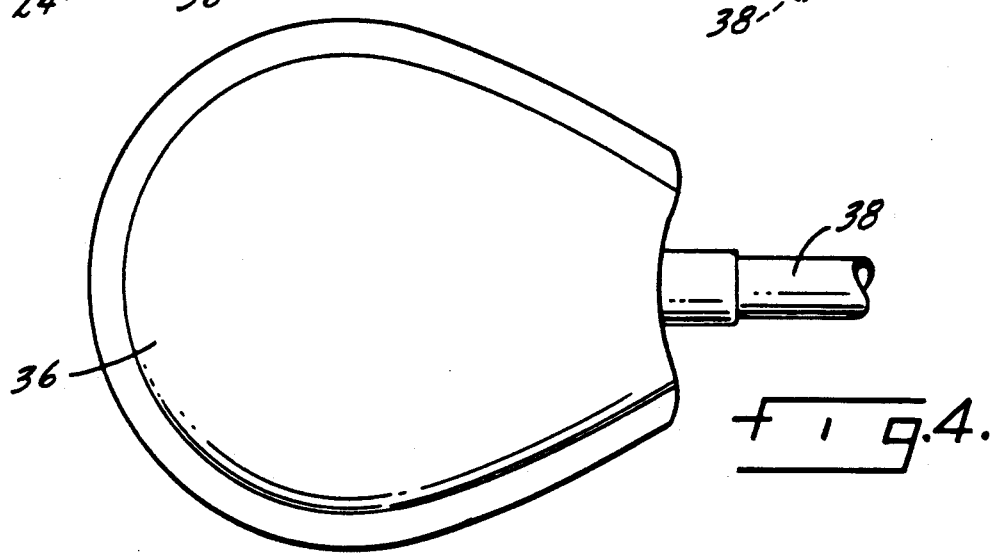

HORSES HOOF COVER WITH PUMP AND METHOD OF USE

THE FIELD OF THE INVENTION

The present invention relates to a method and apparatus for preventing and treating developing "laminitis" in the foot of a horse, a nearly always fatal condition. Specifically, fluid may accumulate or collect near the joint of the coffin bone and the hoof which can soften the area where this bone attaches to the hoof. The invention provides a boot which fits over the hoof of the horse and a small bladder in the bottom of the boot underneath the frog of the horse's hoof. A pump is connected to the bladder and pulsates the bladder to simulate the pumping action of the frog of the horse's hoof as the horse walks.

SUMMARY OF THE INVENTION

The present invention relates to a method and apparatus of preventing laminitis in the foot of a horse.

A primary purpose of the invention is to provide an artificial pumping means for pulsating the frog of a horse's foot to simulate the force applied to the frog when the horse walks.

Another purpose is to provide an apparatus which fits over the hoof of a horse and provides means to pulsate the frog of the horse's hoof to remove fluid which tends to collect in the area where the coffin bone joins the horse's hoof.

Other purposes will appear in the ensuing specification, drawings and claims.

BRIEF DESCRIPTION OF THE DRAWINGS

The invention is illustrated diagrammatically in the following drawings wherein:

FIG. 1 is a side view of the apparatus of the present invention, as applied to the hoof of a horse, FIG. 2 is a vertical section through the hoof and boot of FIG. 1, FIG. 3 is a bottom view of the horse's hoof, and FIG. 4 is a plan view of the bladder which is positioned within the boot of FIGS. 1 and 2.

DESCRIPTION OF THE PREFERRED EMBODIMENT

An accumulation of excess fluid in the area of a horse's hoof where the coffin bone of the foot attaches to the hoof creates a condition known as "laminitis." This condition, if not promptly treated, necessitates destruction of the horse. The hoof of a horse has a soft inner portion called the "frog" which functions as a pump when the horse walks to eliminate the collection of fluid where the coffin bone joins the hoof. Normally when a horse walks, the hoof has a tendency to splay, which is an outward bending of the hoof which applies pressur to the frog. Such pulsation of the frog as the horse walks pumps the fluid from the hoof, eliminating fluid retention. If the horse is unable or unwilling to walk, fluid retention occurs, which left untreated becomes laminitis. Once the onset of laminitis occurs, there is no successful treatment available, with the result that the horse must be destroyed. The present invention provides an artificial means to pulsate the frog of the hoof to insure that laminitis does not occur.

The foot of a horse is indicated at 10 and the foot 10 will have a hoof 12. Looking at FIG. 3, a soft centrally located or inner portion of the hoof, designated the "frog," is shown at 14. Normally, when the horse walks, the hoof will splay outwardly and the frog will pulsate as pressure is applied each time the hoof strikes the ground. There is a coffin bone indicated at 16 which attaches to the bottom of the hoof and the area directly forward of the coffin bone, indicated at 18, is one of the areas where laminitis can occur. A second area for possible laminitis is indicated at 20 and it is along the back of the horse s foot just above the hoof area. Fluid occurring at either of these locations may cause a separation of the coffin bone and the hoof, the result of which is that the weight of the foot is not carried by the bone, but is carried by the hoof, with the result that the coffin bone may push through the bottom of the hoof, necessitating that the animal be destroyed.

A boot is indicated generally at 22 and may be of the type currently sold on the market under the designation "Easy Boot." The boot has a bottom 24 and a side wall 26 which extends upwardly along the side of the horse's hoof. There are side flaps 28 which are attached by cord 30 to a locking device 32. The locking device is adjustable, as evidenced by the several grooves 34, so that the boot may accommodate horse's hoofs of various sizes. In normal use, the boot is placed over the hoof and the cords 30 are pulled as tight as possible so that the sides of the boot closely fit over the hoof.

The present invention utilizes an air bladder 36 which fits within boot 22 at the bottom and generally beneath the area of frog 14. Bladder 36 is connected by a conduit 38 to a pump 40, which may be operated from conventional 12 volt DC power indicated at 42. The pump will pulsate the bladder, which in turn causes a pulsation of the frog, simulating walking, with the result that any excess fluid in the areas which may cause laminitis is pumped up into the leg of the horse, eliminating the possibility of laminitis.

In use, the boot will be placed over the hoof of the horse, as shown in FIG. 2, and there may be such boots on all four feet of the horse, or each foot may be treated separately. In any event, once the boot is so positioned, the pump is turned on and air pressure will be applied to the bladder in a cyclical and pulsating manner to simulate walking of the horse, e.g. pressure on frog 14 of the horse's foot.

Whereas the preferred form of the invention has been shown and described herein, it should be realized that there may be many modifications, substitutions and alterations thereto.

The embodiments of the invention in which an exclusive property are claimed are defined as follows:

1. A method of preventing laminitis in the foot of a horse including the steps of placing the foot of a horse in a boot which encloses the bottom and at least a portion of the sides of the hoof of a horse, the boot containing a bladder located at the bottom of the boot in the area beneath the frog of the hoof, and applying pulsating pressure to the bladder to pulsate the frog to simulate the pressure applied to the frog during walking of the horse.

2. A device for use in preventing laminitis in the foot of a horse including a boot having a bottom and a side wall, with the side wall surrounding the periphery of the horse's hoof and conforming to the shape of all sides of the hoof, a bladder positioned within the boot on its bottom concentrically covering the central portion of the bottom of the boot so that the bladder lies beneath the frog of the hoof, and substantially conforming to the shape of the bottom periphery of the horse's hoof when such is positioned within the boot, a cyclical pump and a connection between the pump and bladder, so that the pump may apply pulsating pressure to the bladder to pulsate the frog of the hoof to simulate the pressure applied to the frog during walking of the horse.

* * * * *